United States Patent [19]
Ding

[11] Patent Number: 5,883,823
[45] Date of Patent: Mar. 16, 1999

[54] SYSTEM AND METHOD OF A FAST INVERSE DISCRETE COSINE TRANSFORM AND VIDEO COMPRESSION/DECOMPRESSION SYSTEMS EMPLOYING THE SAME

[75] Inventor: Wei Ding, Fremont, Calif.

[73] Assignee: Sun Microsystems, Inc., Mountain View, Calif.

[21] Appl. No.: 784,739

[22] Filed: Jan. 15, 1997

[51] Int. Cl.$^6$ .................................................. G06F 17/14
[52] U.S. Cl. ......................................................... 364/725.03
[58] Field of Search ........................ 364/725.01, 725.02, 364/725.03

[56] References Cited

U.S. PATENT DOCUMENTS

| | | | |
|---|---|---|---|
| 5,216,516 | 6/1993 | Tanaka | ..................................... 358/426 |
| 5,576,958 | 11/1996 | Kawakatsu et al. | ................ 364/725.03 |
| 5,739,873 | 4/1998 | Kondo | ..................................... 348/720 |

OTHER PUBLICATIONS

Arai et al., "A Fast DCT–SQ Scheme for Images," The Transactions of the IEICE, vol. E 71, No. 11, Nov. 1988, pp. 1095–1097.

*Primary Examiner*—Chuong D. Ngo
*Attorney, Agent, or Firm*—Conley, Rose & Tayon, PC; B. Noel Kivlin

[57] ABSTRACT

An array of DCT transform coefficients are converted to a two-dimensional array of spatial data in a video compression or decompression system. The array of DCT transform coefficients are divided into two groups. A regional IDCT algorithm is applied to all coefficients, both non-zero and zero, of the first group, while IDCT computation is applied to only non-zero coefficients of the second group. The results of the operations are then combined and/or mapped to form the output array of spatial data. In one specific implementation wherein an 8×8 array of DCT coefficients are to be transformed, the first region is defined by the first quadrant of coefficients in the 8×8 array. A regional IDCT algorithm is applied to both zero and non-zero coefficients in the first quadrant. The non-zero coefficients in the remaining three quadrants are calculated directly, and the results of the direct calculations are combined with the results of the regional IDCT algorithm applied to the first quadrant coefficients. The resulting values are then mapped to the output matrix.

35 Claims, 10 Drawing Sheets

First region coefficients

Remainder region coefficients

FIG. 5

$$F_l(u,v) = \begin{bmatrix} F_{00} & F_{01} & F_{02} & F_{03} \\ F_{10} & F_{11} & F_{12} & F_{13} \\ F_{20} & F_{21} & F_{22} & F_{23} \\ F_{30} & F_{31} & F_{32} & F_{33} \end{bmatrix}$$

Even QIDCT one-dimensional operator: mapping f(0) and f(2) to e(0),e(1),e(2) and e(3), where $b_1$ = 0.414 and scaling factors are $s'_0$ = 0.35355339 and $s'_2$ = 0.461939766.

FIG. 8

Odd QIDCT one-dimensional operator: mapping f(1) and f(3) to o(0),o(1),o(2) and o(3), where $b_2$ = 0.199, $b_3$=0.668, $b_4$=1.414, $b_5$=0.848, $b_6$=0.235 and the scaling factors are $s'_1$ = 0.490392640 and $s'_3$ = 0.415734806.

SYSTEM AND METHOD OF A FAST INVERSE DISCRETE COSINE TRANSFORM AND VIDEO COMPRESSION/ DECOMPRESSION SYSTEMS EMPLOYING THE SAME

FIELD OF THE INVENTION

The present invention relates generally to systems and methods for performing an inverse discrete cosine transform (IDCT). The invention also relates to digital video compression and decompression, and more particularly to a video encoder and decoder system for performing the inverse discrete cosine transform (IDCT) with improved efficiency and reduced computational requirements.

DESCRIPTION OF THE RELATED ART

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the discrete cosine transform (DCT). Intraframe compression typically uses the frequency characteristics of a picture frame to efficiently encode a frame and remove spatial redundancy. Examples of video data compression for still graphic images are JPEG (Joint Photographic Experts Group) compression and RLE (run-length encoding). JPEG compression is a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. The difference frames are further compressed by such techniques as the DCT. Examples of video compression which use an interframe compression technique are MPEG, DVI and Indeo, among others.

MPEG Background

A compression standard referred to as MPEG (Moving Pictures Experts Group) compression is a set of methods for compression and decompression of full motion video images which uses the interframe and intraframe compression techniques described above. MPEG compression uses both motion compensation and discrete cosine transform (DCT) processes, among others, and can yield compression ratios of more than 200:1.

The two predominant MPEG standards are referred to as MPEG-1 and MPEG-2. The MPEG-1 standard generally concerns inter-frame data reduction using block-based motion compensation prediction (MCP), which typically uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bi-directional Interpolated (B) frame. The I or Intraframes contain the video data for the entire frame of video and are typically placed every 10 to 15 frames. Intraframes provide entry points into the file for random access, and are generally only moderately compressed. Predicted frames are encoded with reference to a past frame, i.e., a prior Intraframe or Predicted frame. Thus P frames only include changes relative to prior I or P frames. In general, Predicted frames receive a fairly high amount of compression and are used as references for future Predicted frames. Thus, both I and P frames are used as references for subsequent frames. Bi-directional pictures include the greatest amount of compression and require both a past and a future reference in order to be encoded. Bi-directional frames are never used as references for other frames.

In general, for the frame(s) following a reference frame, i.e., P and B frames that follow a reference I or P frame, only small portions of these frames are different from the corresponding portions of the respective reference frame. Thus, for these frames, only the differences are compressed and stored. The differences between these frames are typically generated using motion vector estimation logic, as discussed below.

When an MPEG encoder receives a video file or bitstream, the MPEG encoder generally first creates the I frames. The MPEG encoder may compress the I frame using an intraframe compression technique. After the I frames have been created, the MPEG encoder divides respective frames into a grid of 16×16 pixel squares called macroblocks. The respective frames are divided into macroblocks in order to perform motion estimation/compensation. Thus, for a respective target picture or frame, i.e., a frame being encoded, the encoder searches for an exact, or near exact, match between the target picture macroblock and a block in a neighboring picture referred to as a search frame. For a target P frame the encoder searches in a prior I or P frame. For a target B frame, the encoder searches in a prior or subsequent I or P frame. When a match is found, the encoder transmits a vector movement code or motion vector. The vector movement code or motion vector only includes information on the difference between the search frame and the respective target picture. The blocks in target pictures that have no change relative to the block in the reference picture or I frame are ignored. Thus the amount of data that is actually stored for these frames is significantly reduced.

After motion vectors have been generated, the encoder then encodes the changes using spatial redundancy. Thus, after finding the changes in location of the macroblocks, the MPEG algorithm further calculates and encodes the difference between corresponding macroblocks. Each macroblock is comprised of four subblocks, of size 8×8 each, for brightness or luminance signal and corresponding two, four or eight subblocks for color or chrominance signal depending on color formats. Encoding the difference is accomplished through a math process referred to as the discrete cosine transform or DCT. This process operates on each 8×8 block.

For frames which are used as references for other frames, the MPEG encoder is required to reverse the quantization and DCT transform on these blocks in order to recover the resultant pixel data. This resultant pixel data is used for motion estimation on subsequent frames, such as P and B frames. Thus MPEG encoders generally include inverse quantization logic as well as inverse DCT logic.

Therefore, MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks, and each block is transformed via the discrete cosine transform (DCT). After the transformed blocks are converted to the "DCT domain", each entry in the transformed block is quantized with respect to a set of quantization tables. The quantization step for each entry can vary, taking into account the sensitivity of the human visual system (HVS) to the frequency. Since the HVS is more sensitive to low frequencies, most of the high frequency entries are quantized to zero. In this step where the entries are quantized, information is lost and errors are introduced to the reconstructed image. Run length encoding is used to transmit the quantized values. To further enhance compression, the blocks are scanned in a zig-zag ordering that scans the lower frequency entries first, and the non-zero quantized values, along with the zero run lengths, are entropy encoded.

As discussed above, temporal compression makes use of the fact that most of the objects remain the same between consecutive picture frames, and the difference between objects or blocks in successive frames is their position in the frame as a result of motion (either due to object motion, camera motion or both). This relative encoding is achieved by the process of motion estimation. The difference image as a result of motion compensation is further compressed by means of the DCT, quantization and RLE entropy coding.

When an MPEG decoder receives an encoded stream, the MPEG decoder reverses the above operations. Thus the MPEG decoder performs inverse scanning to remove the zig zag ordering, inverse quantization to de-quantize the data, and the inverse DCT to convert the data from the frequency domain back to the pixel domain. The MPEG decoder also performs motion compensation using the transmitted motion vectors to recreate the temporally compressed frames.

Computation of the inverse discrete cosine transform (IDCT) generally requires a large amount of processing. One known method for computing the IDCT is referred to as the Chen algorithm. Prior art techniques for computing the Chen algorithm have used a Booth-Coded Multiplier with the coefficients stored in a ROM/RAM. However, this method has disadvantages, including inefficient use of die area due to the conventional implementation of multipliers and test complexity due to the usage of ROM/RAM for coefficient storage. In addition, this method does not take advantage of the inherent symmetry property of the coefficients in optimizing multipliers. Finally, this method provides generally low throughput.

Another method for computing the IDCT is referred to as the AAN algorithm. The AAN algorithm is a separable full IDCT algorithm which results in relatively good performance in video compression and decompression systems. As described previously, typical video compression/decompression systems rely upon computation of an 8×8 block of spacial data from an 8×8 block of discrete cosine transform coefficients. When the AAN algorithm is applied to a full two-dimensional 8×8 block of discrete cosine transform coefficients, many of the multiplications required to perform the transform are performed in parallel, thus allowing a relatively fast overall calculation. Despite this, however, it would still be desirable in typical systems to perform the IDCT operation upon the 8×8 block of discrete cosine transform coefficients even faster.

Yet another algorithm for performing IDCT operations is referred to as the symmetric mapped IDCT (SMIDCT). This algorithm exploits the fact that in typical image and video applications, the transformed coefficients are sparse, i.e., many coefficients are zero. When the number of non-zero coefficients are small, which is the case for typical applications, this algorithm may be faster than the full AAN algorithm.

A new system and method are desired for efficiently computing the inverse discrete cosine transform. It is particularly desirable to provide a system for computing the inverse discrete cosine transform which performs better than both the AAN and the SMIDCT algorithms in video applications.

SUMMARY OF THE INVENTION

The problems outlined above are in large part solved by a system and method of a fast inverse discrete cosine transform in accordance with the present invention. In one embodiment, an array of DCT transform coefficients are converted to a two-dimensional array of spatial data. The array of DCT transform coefficients are divided into two groups. A regional IDCT algorithm is applied to all coefficients, both non-zero and zero, of the first group, while IDCT computation is applied to only non-zero coefficients of the second group. The results of the operations are then combined and/or mapped to form the output array of spatial data.

In one specific implementation wherein an 8×8 array of DCT coefficients are to be transformed, the first region is defined by the first quadrant of coefficients in the 8×8 array. A regional IDCT algorithm is applied to both zero and non-zero coefficients in the first quadrant. The non-zero coefficients in the remaining three quadrants are calculated directly, and the results of the direct calculations are combined with the results of the regional IDCT algorithm applied to the first quadrant coefficients. The resulting values are then mapped to the output matrix. The regional IDCT algorithm may be carried out by grouping the coefficients in the first quadrant into four groups (i.e., even-row-even-column, even-row-odd-column, odd-row-even-column and odd-row-odd-column) according to the parities of the row and column indices of the coefficients. From these groupings, predetermined even and odd IDCT operators are applied row-wise and column-wise to derive an even-even IDCT component class, and odd-even IDCT component class, and even-odd IDCT component class, and an odd-odd IDCT component class. The result of the direct IDCT calculation performed upon each of the non-zero coefficients in the remaining quadrants is then added to the corresponding component class. After adding the result of each direct IDCT calculation to the IDCT component classes obtained from the first quadrant coefficients, the resulting IDCT component classes are combined to form the output matrix.

The fast inverse discrete cosine transform methodology may be employed within a computation unit of a video encoder or decoder system. The DCT coefficients and resulting spatial data may be stored within a memory of the video encoder or decoder system. A video encoder or decoder employing the fast inverse discrete cosine transform methodology in accordance with the present invention may advantageously achieve high performance.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Video Compression System

Figure 1:
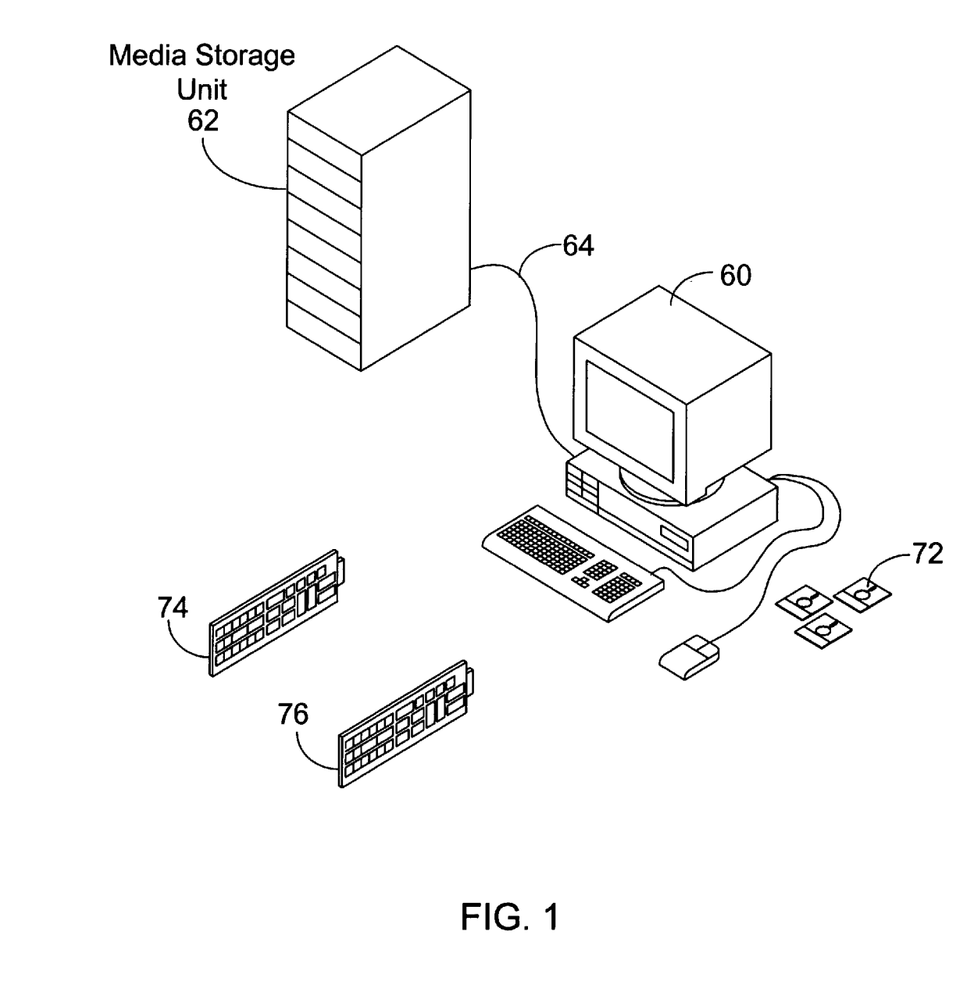
FIG. 1 is a diagram of a computer system which performs video decoding and which includes a mechanism for performing the fast inverse discrete cosine transform in accordance with the present invention.

Referring now to FIG. 1, one embodiment of a system for performing video compression and/or decompression operations according to the present invention is shown. The system performs computation of the inverse discrete cosine transform (IDCT) during video encoding or video compression and/or video decoding or video decompression. In other embodiments, the system and method of the present invention may be used to perform IDCT operations for use in other various types of applications, as desired.

As shown, in one embodiment the video encoding/decoding system comprises a general purpose computer system 60. The video encoding/decoding system may comprise any of various types of systems, including a computer system, set-top box, television, or other device. In various embodiments, one or both of the video encoding and video decoding operations include the improved IDCT computation system and method of the present invention.

The computer system 60 is preferably coupled to a media storage unit 62 which stores digital video files which are to be decompressed or decoded by the computer system 60. The media storage unit 62 may also store the resultant decoded or decompressed video file. In the preferred embodiment, the computer system 60 receives a compressed video file or bitstream and generates a normal uncompressed digital video file. In the present disclosure, the term "compressed video file" refers to a video file which has been compressed according to any of various video compression algorithms which use motion estimation techniques, including the MPEG standard, among others, and the term "uncompressed digital video file" refers to a stream of decoded or uncompressed video.

As shown, the computer system 60 preferably includes a video decoder 74 which performs video decoding or decompression operations. In one embodiment, the video decoder 74 is an MPEG decoder. The computer system 60 optionally may also include a video encoder 76, which in one embodiment is an MPEG encoder. The video decoder 74 and video encoder 76 are preferably adapter cards coupled to a bus in the computer system, but are shown external to the computer system 60 for illustrative purposes. The computer system 60 also includes software, represented by floppy disks 72, which may perform portions of the video decompression or decoding operation, or performs portions of the video compression or encoding operation, and/or may perform other operations, as desired.

Figure 2:
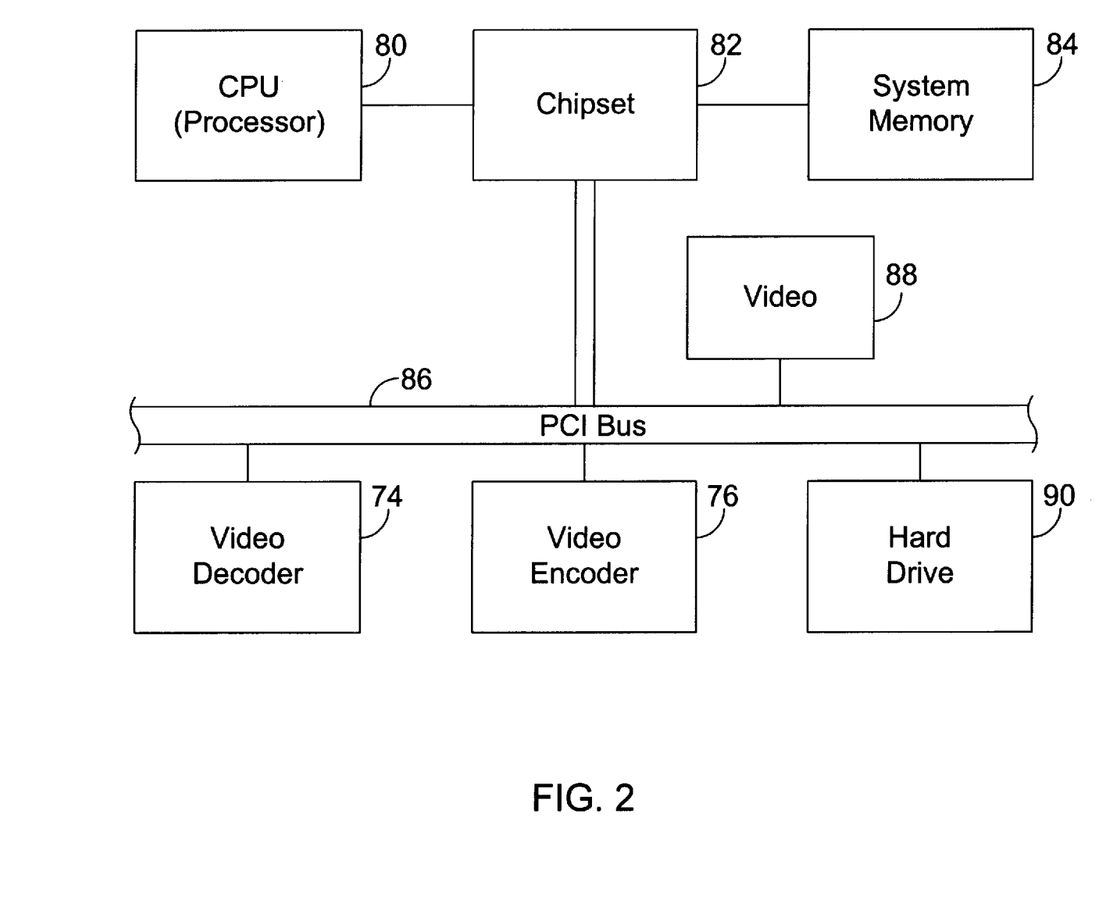
FIG. 2 is a block diagram illustrating the computer system of FIG. 1.

The computer system 60 preferably includes various standard components, including one or more processors, one or more buses, a hard drive and memory. Referring now to FIG. 2, a block diagram illustrating the components comprised in the computer system of FIG. 1 is shown. It is noted that FIG. 2 is illustrative only, and other computer architectures may be used, as desired. As shown, the computer system includes at least one processor 80 coupled through chipset logic 82 to a system memory 84. The chipset 82 preferably includes a PCI (Peripheral Component Interconnect) bridge for interfacing to PCI bus 86, or another type of bus bridge for interfacing to another type of expansion bus. In FIG. 2, video decoder 74 and video encoder 76 are shown connected to PCI bus 86. Various other components may be comprised in the computer system, such as video 88 and hard drive 90.

As mentioned above, in the embodiment of FIG. 1 the computer system 60 includes or is coupled to one or more digital storage or media storage devices. For example, in the embodiment of FIG. 1, the computer system 60 couples to media storage unit 62 through cable 64. The media storage unit 62 preferably comprises a RAID (Redundent Array of Inexpensive Disks) disk array, or includes one or more CD-ROM drives and/or one or more Digital Video Disk (DVD) storage units, or other media, for storing digital video to be decompressed and/or for storing the resultant decoded video data. The computer system may also include one or more internal RAID arrays, CD-ROM drives and/or may couple to one or more separate Digital Video Disk (DVD) storage units. The computer system 60 also may connect to other types of digital or analog storage devices or media, as desired.

Alternatively, the compressed digital video file may be received from an external source, such as a remote storage device or remote computer system. The computer system may include an input device, such as an ATM (Asynchronous Transfer Mode) adapter card or an ISDN (Integrated Services Digital Network) terminal adapter, or other digital data receiver, for receiving the digital video file. The digital video file may also be stored or received in analog format and converted to digital data, either externally to the computer system 60 or within the computer system 60.

As mentioned above, the video decoder 74 in the computer system 60 performs video decoding or video decompression functions. In performing video decoding or video decompression, the video decoder 74 performs the inverse discrete cosine transform (IDCT) As discussed further below, the MPEG decoder 74 in the computer system 60 may compute the IDCT with improved performance.

As also mentioned above, the video encoder 76 in the computer system 60 performs video encoding or video compression functions. In performing video encoding or video compression, the video encoder 76 performs the inverse discrete cosine transform (IDCT) on certain data. As is also discussed further below, the video encoder 76 in the computer system 60 may compute the IDCT with improved performance.

It is noted that the system of FIG. 1 may comprise two or more interconnected computers, as desired. The system for encoding or decoding video data may alternatively comprise other hardware, such as a set top box, either alone or used in conjunction with a general purpose programmable computer. The system for encoding or decoding video data may be implemented within CPU 80 either entirely or partially in software for computation of encoding or decoding process. It is noted that any of various types of systems may be used for encoding and/or decoding video data according to the present invention, as desired.

Figure 3:
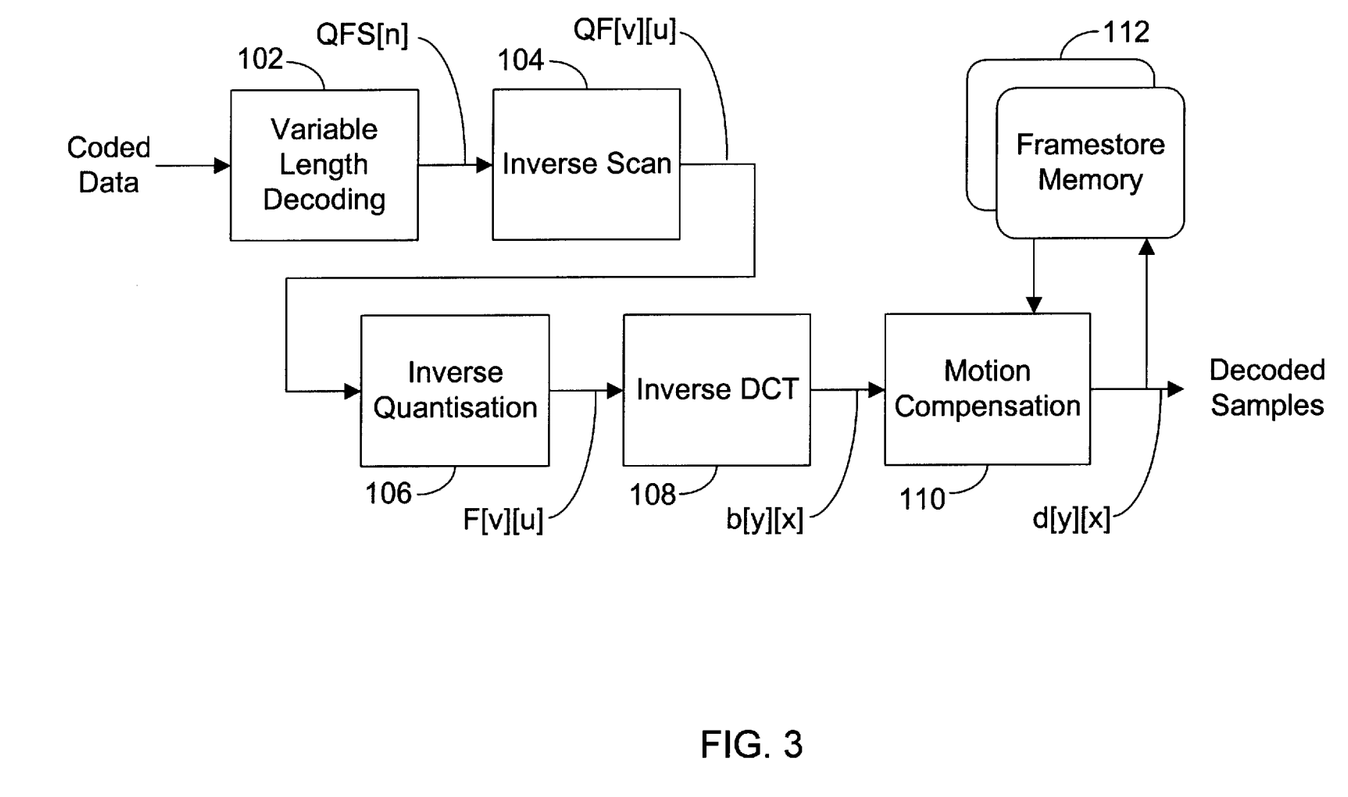
FIG. 3 is a block diagram illustrating a video decoder.

FIG. 3—MPEG Decoder Block Diagram

Referring now to FIG. 3, a block diagram illustrating one embodiment of the video decoder 74 which performs IDCT computations according to the present invention is shown. As shown, the video decoder 74 receives an encoded or compressed digital video stream and outputs an uncompressed digital video stream. The compressed digital video stream is a bitstream of compressed video data which is used to present a video sequence, such as a television segment or movie, onto a screen, such as a television or a computer system. In one embodiment, the compressed digital video stream is compressed using the MPEG-2 compression algorithm, and the video decoder 74 is thus an MPEG-2 decoder. Since the operation of MPEG decoders is well known in the art, details of their operation which are not necessary to the operation of the present invention are omitted for simplicity.

As shown in FIG. 3, the video decoder 74 comprises a Variable Length Decoding block 102 coupled to provide an output to an Inverse Scan block 104, which is coupled to provide an output to an Inverse Quantization block 106, which is coupled to provide an output to an Inverse DCT block 108, which is coupled to provide an output to a motion compensation block 110. The motion compensation block 110 provides an output comprising decoded samples. A frame store memory 112 is coupled to the output of the motion compensation block 110 to receive and store decoded frame data. The motion compensation block 110 is coupled to an output of the frame store memory 112 to receive reference block data from the frame store memory 112 during motion compensation.

As shown in FIG. 3, the Variable Length Decoding block 102 receives coded data and performs variable length decoding. As is well known, the MPEG standard provides that data is compressed for transmission using variable length codes. Thus the Variable Length Decoding block 102 decodes this data and produces an output, referred to as QFS[n]. The QFS[n] output of the Variable Length Decoding block 102 is provided to the Inverse Scan block 104. The Inverse Scan block 104 reverses the zig zag scan ordering of the received data (is this right) and produces an output referred to as QF[v][u]. The output QF[v][u] is provided to the Inverse Quantization block 106. The Inverse Quantization block 106 performs inverse quantization or de-quantizes the data to produce de-quantized data, referred to as F[v][u]. The output F[v][u] of the Inverse Quantization block 106 is provided to the Inverse DCT block 108, which performs the inverse discrete cosine transform to convert the data from the frequency domain back to the pixel domain. As discussed further below, the IDCT block 108 performs the IDCT with improved efficiency. The inverse DCT block 108 produces an output referred to as f[y][x]. The output f[y][x] of the inverse DCT block 108 is provided to the motion compensation block 110.

The output b[y][x] from the inverse DCT block 108 comprises temporally encoded frames of pixel data. The motion compensation block 110 decompresses the temporally compressed frames using motion compensation techniques. Output pixel values from the motion compensation block 110 are provided to a frame store memory 112. The frame store memory 112 is thus coupled to the motion compensation block 110 and stores one or more reference frames of video data. These reference frames of video data are used by the motion compensation block 110 in performing motion compensation on temporally compressed frames, such as P and B frames.

Figure 4:
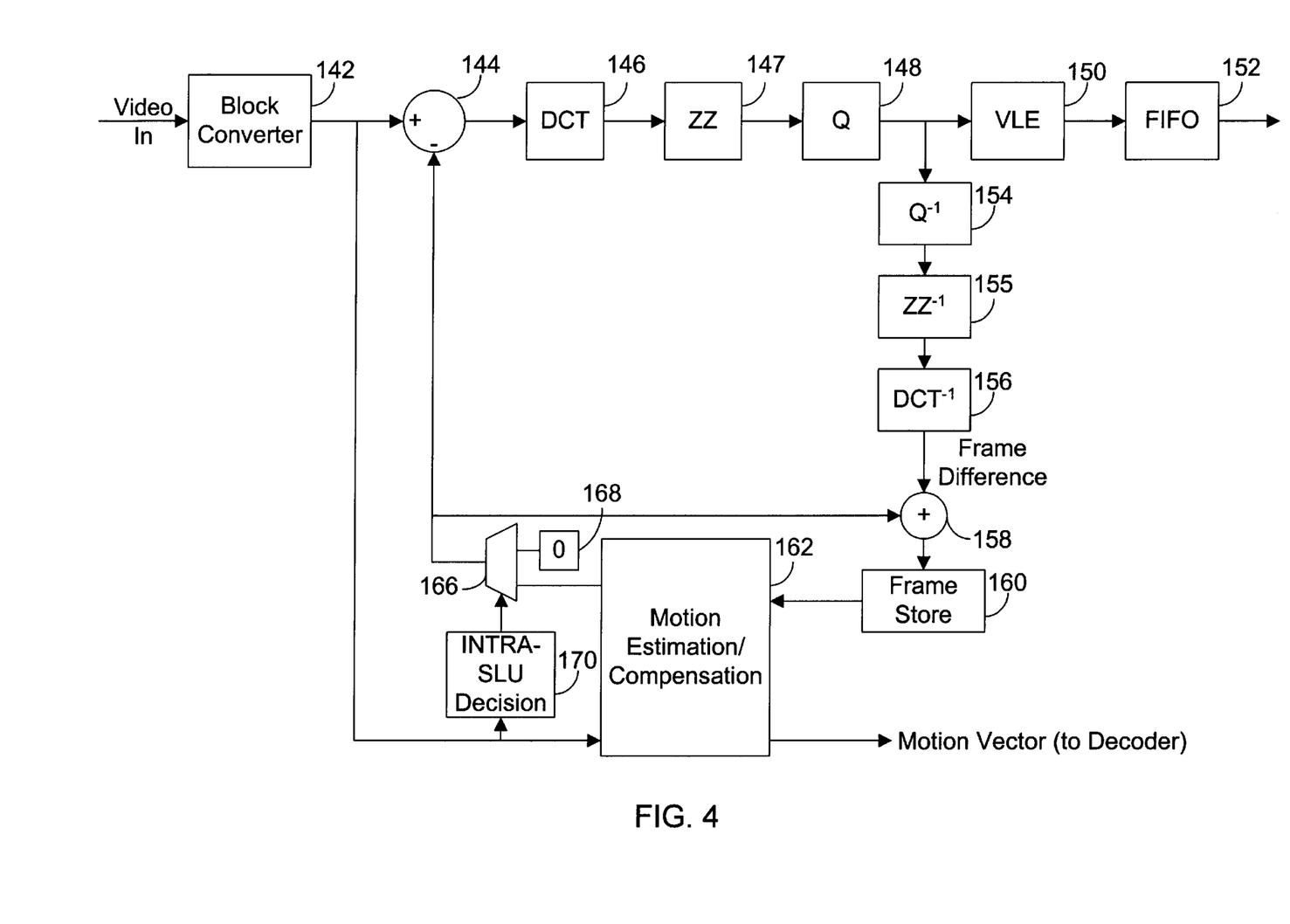
FIG. 4 is a block diagram illustrating a video encoder.

FIG. 4—MPEG Encoder Block Diagram

Referring now to FIG. 4, a block diagram illustrating an embodiment of video encoder 76 which performs the IDCT according to the present invention is shown. As shown, the video encoder 76 receives an uncompressed digital video stream and outputs an encoded stream. The uncompressed digital video stream is a bitstream of video data which is used to present a video sequence, such as a television segment or movie, onto a screen, such as a television or a computer system. In one embodiment, the video encoder 76 compresses the uncompressed digital video stream using the MPEG-2 compression algorithm.

As shown in FIG. 4, a block converter 142 converts input luminance and chrominance video signals to block format, where each block preferably comprises an 8×8 matrix of 64 pixel values. The block format is preferably implemented as a plurality of macroblocks grouped into particular spacing formats depending upon the particular type of encoding system, such as the standard 4:4:4, 4:2:2, 4:2:0 etc. spacing formats, for example. The block converter 142 provides sequential pixel values to a subtractor 144 and to motion estimation/compensation logic 162, described further below. The block converter 102 also provides an output to an Intra-SW decision block 170.

The subtractor 144 receives an input from a multiplexer 166 and operates to subtract the output of the multiplexer 166 from the output of the block converter 142. The multiplexer 166 receives inputs from the motion estimation/compensation logic 162 and also receives a 0 input from block 168. The multiplexer 166 receives a select input from the Intra-SW decision block 170. The Intra-SW decision block 170 determines whether an interfield or intrafield mode is being used. In the interfield data mode, the multiplexer 166 provides the output from the motion estimation/compensation block 162, and the subtractor 142 subtracts each block of a macroblock provided by motion estimation/compensation logic 162 from a corresponding block provided from the block converter 142. In the intrafield data mode, the multiplexer 166 provides an output from the zero block 168, and thus the blocks from the block converter 142 pass through the subtractor 144 unmodified.

The subtractor 144 provides output blocks of motion-predicted, differentially encoded macroblocks (intermode) or unmodified output blocks (intramode) to a DCT converter 146. The DCT converter 146 converts each of the blocks to DCT format, resulting in corresponding 8×8 blocks of DCT coefficients. The DCT format expresses the data in the frequency domain for enabling compression of video data. For each DCT block, the first or top left coefficient typically comprises the DC component of the block, and the remaining values are AC components for increasing vertical and horizontal frequencies.

The DCT coefficients from the DCT converter 146 are provided to a ZZ block 147 which re-orders the pixels in a zig zag format. The output of the ZZ block 147 is provided to a quantizer 148, which maps sets of coefficient values into a quantized value. Smaller sets are typically used for the lower-frequency coefficients, i.e., fine quantization, than for the higher-frequency coefficients, since the human eye is less sensitive to image components at higher spatial frequencies than to components at lower spatial frequencies.

The data values from the quantizer 148 are provided to a variable length encoder (VLE) 150 for encoding the data for purposes of storage and/or transmission. The VLE 150 scans and converts the blocks of data to variable length codes (VLCs) according to the principles of entropy coding, where shorter codes are allocated to the more probable values to achieve coding gain and thus compression of the data. One such VLC coding scheme is referred to as Huffman coding, although other coding schemes are contemplated. The VLCs are provided from the VLE 150 to a first-in first-out (FIFO) buffer 152.

For the interfield mode, the data values from the quantizer 148 are provided to an inverse quantizer 154 for reversing the operation performed by the quantizer 148 to produce approximate DCT coefficients representing each block of the encoded image. Since quantization is usually a lossy process, the output of the inverse quantizer 154 introduces noise and errors.

The output data of the inverse quantizer 154 is provided to an inverse ZZ block 155 which reverses the operation of the ZZ block 147. The output of the inverse ZZ block 155 is provided to an inverse DCT (IDCT) converter 156 for reversing the operation performed by the DCT converter 146. As discussed further below, the IDCT converter 156 preferably performs IDCT computations according to the present invention. The frame difference blocks at the output of the IDCT converter 156 are provided to one input of a two-input adder 158. The adder 158 also receives the output data blocks from the motion compensation logic 162. The output pixel values from the adder 158 are provided to a frame store memory 160, where the stored data may be provided to a video buffer (not shown) and displayed on a display device (not shown), such as a monitor.

The values in the frame store memory 160 are provided to the input of the motion estimation/compensation logic 162. In general, the motion estimation/compensation logic 162 compares the incoming block from the block converter 142 with the reconstructed previous block stored in the frame store memory 160 to measure motion in the form of motion vectors. The motion estimation/compensation logic 162 of FIG. 3 performs motion estimation in the spatial domain using prior art techniques.

The motion estimation/compensation logic 162 shifts objects or blocks to estimated positions in the new frame, resulting in predicted blocks. In the interfield mode, this predicted block is then subtracted from the input block to obtain a block difference or prediction error. This process separates interframe redundancy and the prediction error. In the interfield mode, the block difference is then processed by the DCT converter 146, ZZ block 147, and the quantizer 148 to remove spatial redundancy. Thus, in this method, motion estimation is performed in the spatial or pixel domain, and the frame difference is then DCT transformed and quantized.

Inverse DCT

As stated above, the computation of the inverse DCT may be performed in either video decoder 74 or video encoder 76. In one implementation the inverse DCT involves receiving un-quantized DCT coefficient data, referred to as F[u][v], and performing the inverse discrete cosine transform to convert the data from the frequency domain back to the pixel domain. Inverse DCT operations are typically performed for a block of 8×8 data in many image and video compression applications. The inverse DCT produces an output referred to as b(x,y).

An 8-point one-dimensional IDCT is defined by $$b(x) = \sum_{u=0}^{7} a(u)F(u)\cos\left[\frac{\pi(2x+1)u}{16}\right], \quad (1)$$

where F(u), u=0,1, . . . ,7 are the DCT coefficients and b(x), x=0,1 . . . ,7 are the spatial domain data. The normalization factors a(u) are $$a(0) = \frac{1}{2\sqrt{2}}, \quad a(u) = \frac{1}{2} \text{ for}(u = 1,2,\ldots,7).$$

The two-dimensional 8×8 IDCT is defined by $$b(x,y) = \sum_{u=0}^{7} \sum_{v=0}^{7} a(u)a(v)F(u,v)\cos\left[\frac{\pi(2x+1)u}{16}\right]\cos\left[\frac{\pi(2y+1)v}{16}\right], \quad (2)$$

where F(u,v), u=0,1 . . . ,7, v=0,1 . . . ,7 are the DCT coefficients arranged in an 8×8 array and b(x,y), x=0,1, . . . ,7, y=0,1, . . . ,7 are the spatial domain data. It is noted that the two-dimensional IDCT is a separable transform, and can be calculated by applying a one-dimensional IDCT to the rows of the 8×8 block of coefficients and then to the columns, or in the reverse order.

As stated previously, a number of algorithms have been developed to perform a fast full IDCT from an 8×8 block of DCT coefficients, such as the AAN algorithm. For typical image and video compression applications, the 8×8 transform coefficient block is a sparse matrix, i.e. many coefficients are zero. Furthermore, the non-zero coefficients are normally distributed in the low-frequency area, i.e. the area where both row and column indices of the coefficients are small numbers. From the first attribute it is recognized that for blocks with a small number of non-zero coefficients it may take less computation to directly calculate the IDCT data for each non-zero coefficient from the equation (2) than to perform a full IDCT from all coefficients. From the second attribute it is recognized that application of a regional IDCT algorithm that calculates IDCT data from low-frequency coefficients (such as from the 4×4 array of coefficients in the first quadrant) can further speed up the computation, especially when the number of coefficients in the specified low-frequency region (such as the first quadrant) is more than a certain threshold.

Figure 5:
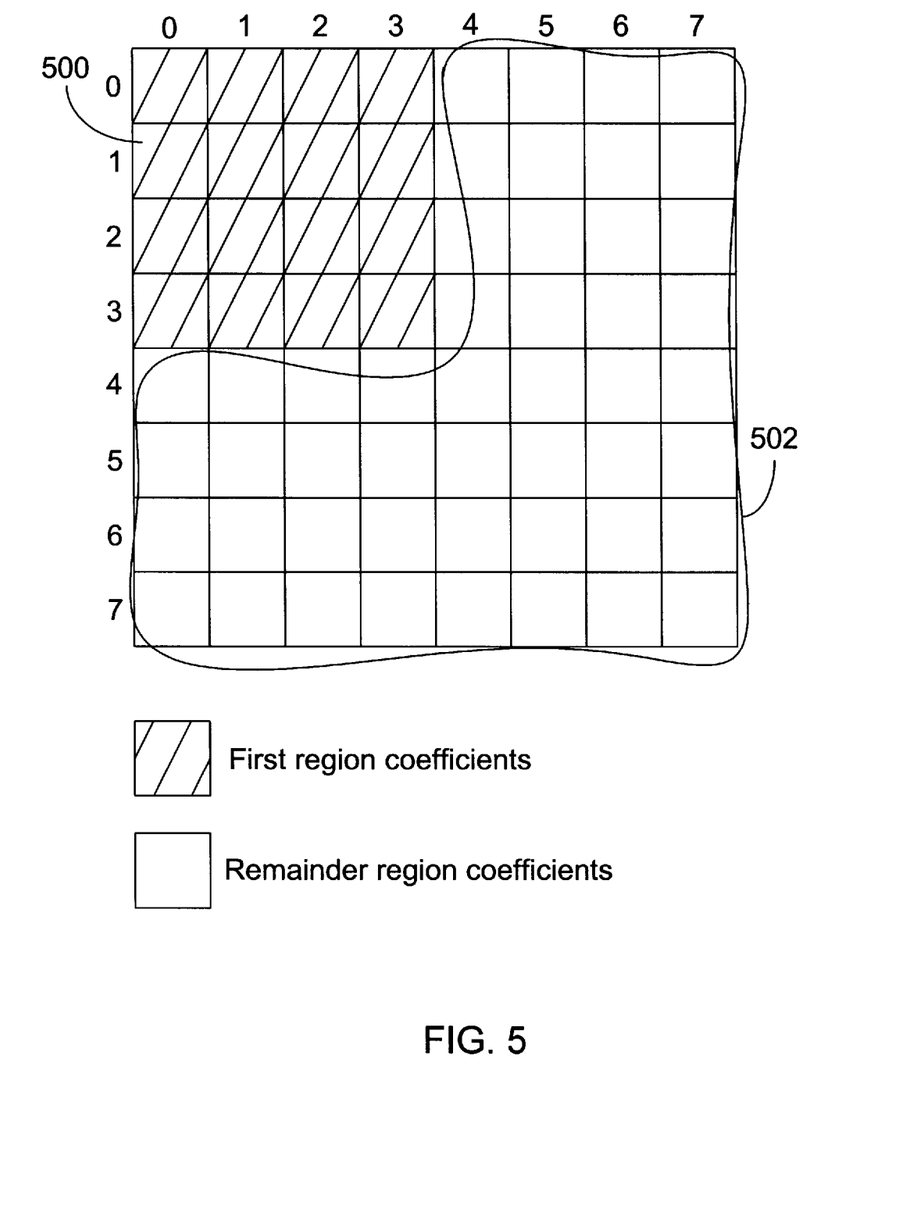
FIG. 5 is a diagram that illustrates an exemplary partitioning of an 8×8 DCT coefficient matrix into two regions.

Accordingly, in one embodiment of the present invention, the 8×8 DCT transformed coefficients are partitioned into at least two regions. FIG. 5 illustrates an exemplary partitioning. FIG. 5 illustrates a first region 500 formed by the first quadrant of the coefficient matrix and a remainder region 502 formed by quadrants 2, 3, and 4 of the matrix. As will be described in further detail below, a regional IDCT algorithm is applied to the coefficients F (U, V) (U, V=0, 1, 2, 3) in the first region 500. As used herein, a "regional IDCT algorithm" means any algorithm applied to a given region in which all DCT coefficients of the defined region, both non-zero and zero coefficients, are applied to the calculation of the inverse DCT. An exemplary regional IDCT algorithm is the AAN algorithm as described above. For the remainder region 502, direct IDCT calculation is performed upon each non-zero coefficient. Direct IDCT calculation may be effectuated through calculation of equation (2) for each non-zero coefficient. Calculations upon zero coefficients within remainder region 502 are not performed. The results from both regions are then combined together to derive the 8×8 spacial data b(x, y) results of the IDCT operation.

Details regarding one specific implementation of the present invention are next considered. In this implementation, a set of sub-block accumulators $s_{rp, cp}(x, y)$ are maintained, where rp=0, 1 and cp=0, 1 are row parity and column parity, respectively, and x=0, 1, 2, 3 and y=0, 1, 2, 3. The sub-block accumulators $s_{rp, cp}(x, y)$ are initialized to 0 as illustrated by the following equation:

$$s_{rp, cp}(x, y) = 0$$

Figure 6:
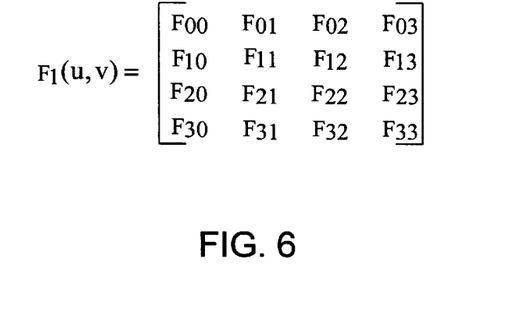
FIG. 6 illustrates the first quadrant DCT coefficient matrix.

Computation is performed with respect to all coefficients in the first region 500 using a regional IDCT algorithm. The DCT coefficients in the first region 500 are illustrated in FIG. 6. For this particular implementation of a regional IDCT algorithm, the 4×4=16 coefficients (i.e., F (u, v), u, v=0, 1, 2, 3) in the first region 500 are divided into four groups: even-row-even-column, even-row-odd-column, odd-row-even-column, odd-row-odd-column, according to the parities of the row and column indices of the coefficients. These four groups are illustrated in FIG. 7.

Figure 7:
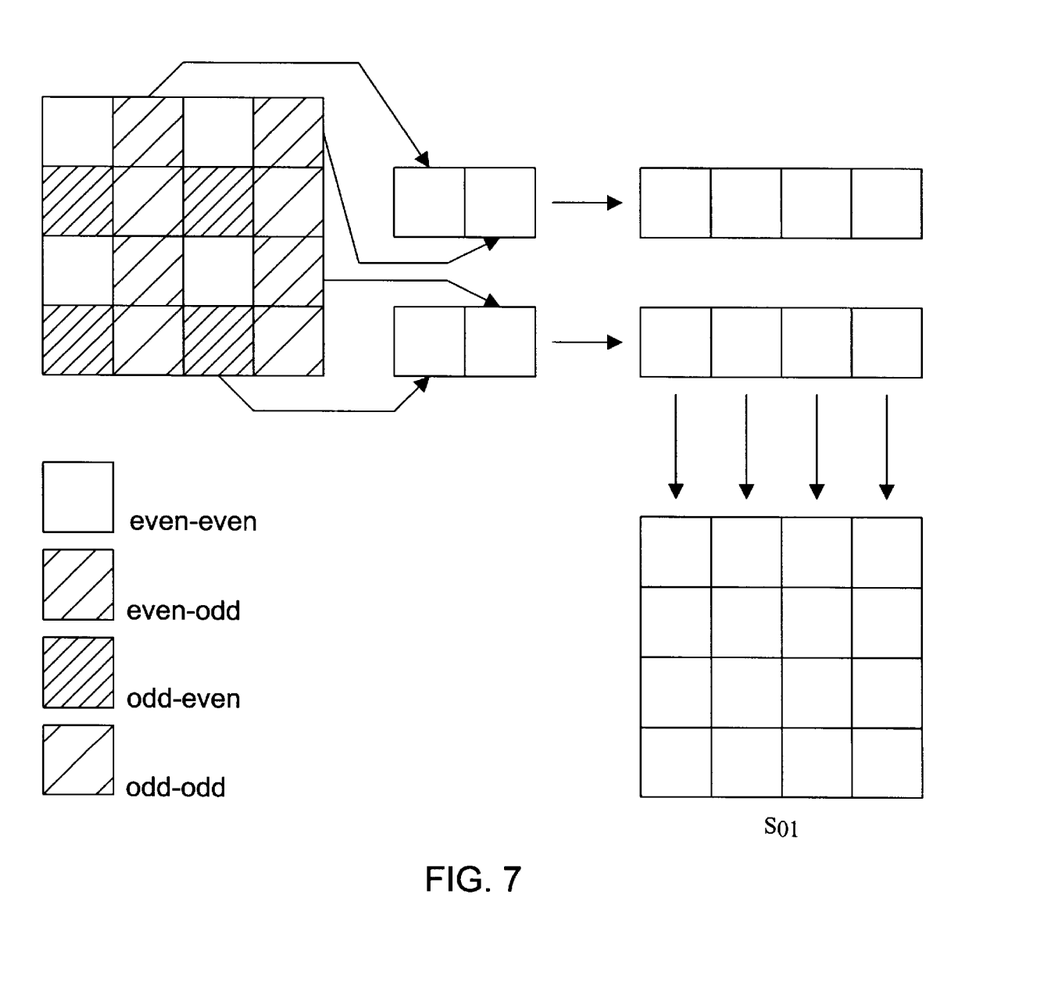
FIG. 7 is a diagram that illustrates the grouping of DCT coefficients in the first quadrant into even-even group, and even-odd group, and odd-even group, and an odd-odd group.

FIG. 7 further illustrates a generalized manner in which the DCT coefficient data defined by the four groupings is transformed into a set of IDCT component classes referred to as $s_{00}$, $s_{01}$, $s_{10}$, and $s_{11}$. Details regarding the calculation of each component class is best understood with reference to the even one-dimensional operator illustrated by FIG. 8, the odd one-dimensional operator illustrated by FIG. 9, and the exemplary calculations illustrated in FIGS. 10 and 11 for $s_{00}$ and $s_{01}$, respectively.

Figure 8:
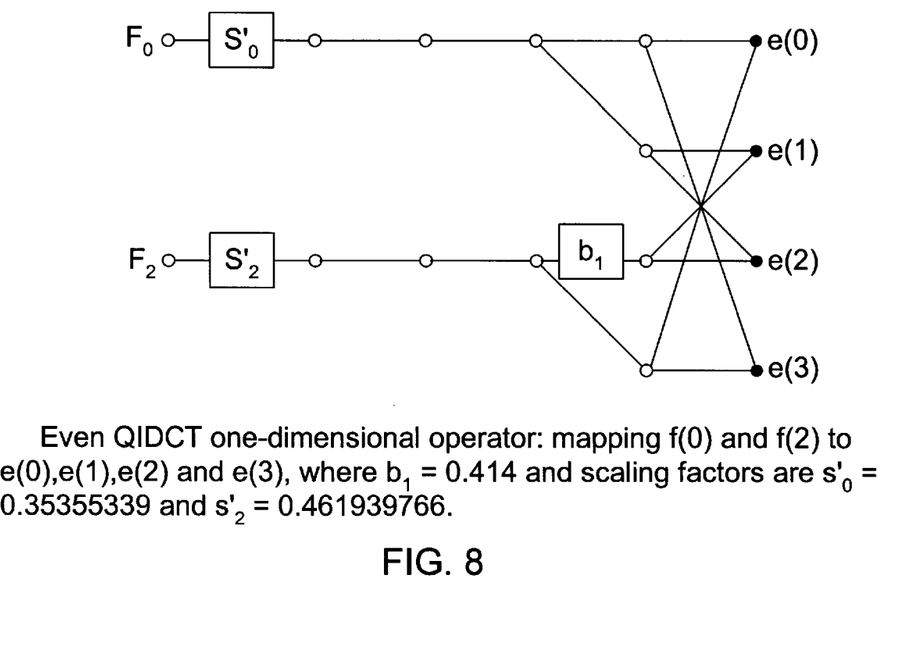
FIG. 8 is a diagram of an even one-dimensional operator.
Figure 9:
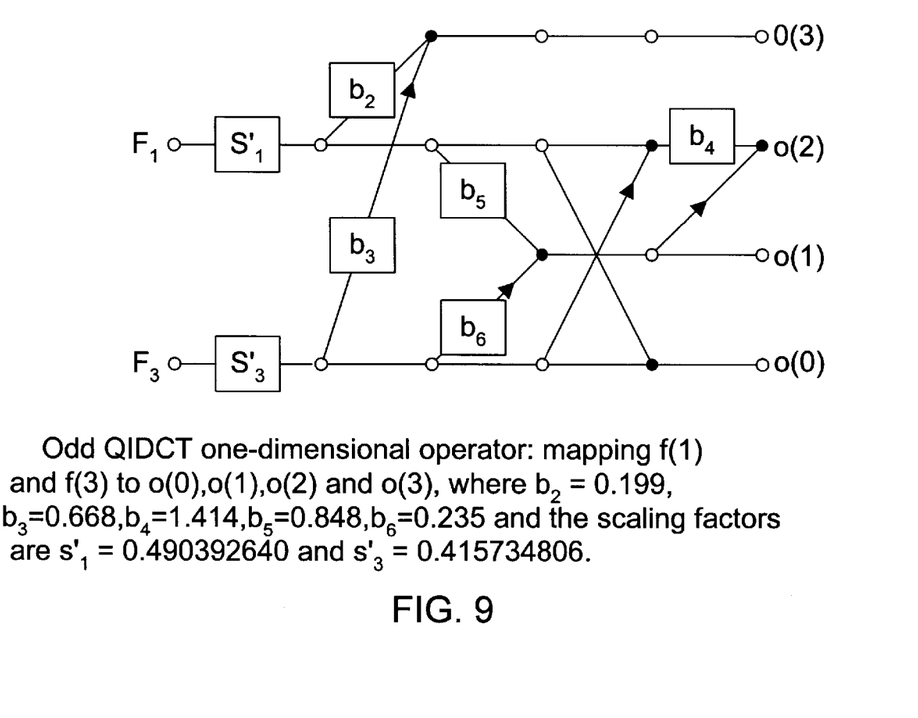
FIG. 9 is a diagram of an odd one-dimensional operator.

For the even and odd operators of FIGS. 8 and 9, respectively, even coefficients $F_0$ and $F_2$ are mapped to e(0), e(1), e(2) and e(3), and odd coefficients $F_1$ and $F_3$ are mapped to o(0), o(1), o(2) and o(3). Two lines joining with a solid circle means that an addition is performed. An empty circle means no operation performed. A line with a box means that a multiplication is performed. A line with an arrow means a negative value. The following parameters are applicable to FIGS. 8 and 9:

$b_1 = 0.414$
$b_2 = 0.199$
$b_3 = 0.668$
$b_4 = 1.414$
$b_5 = 0.848$
$b_6 = 0.235$

Figure 10:
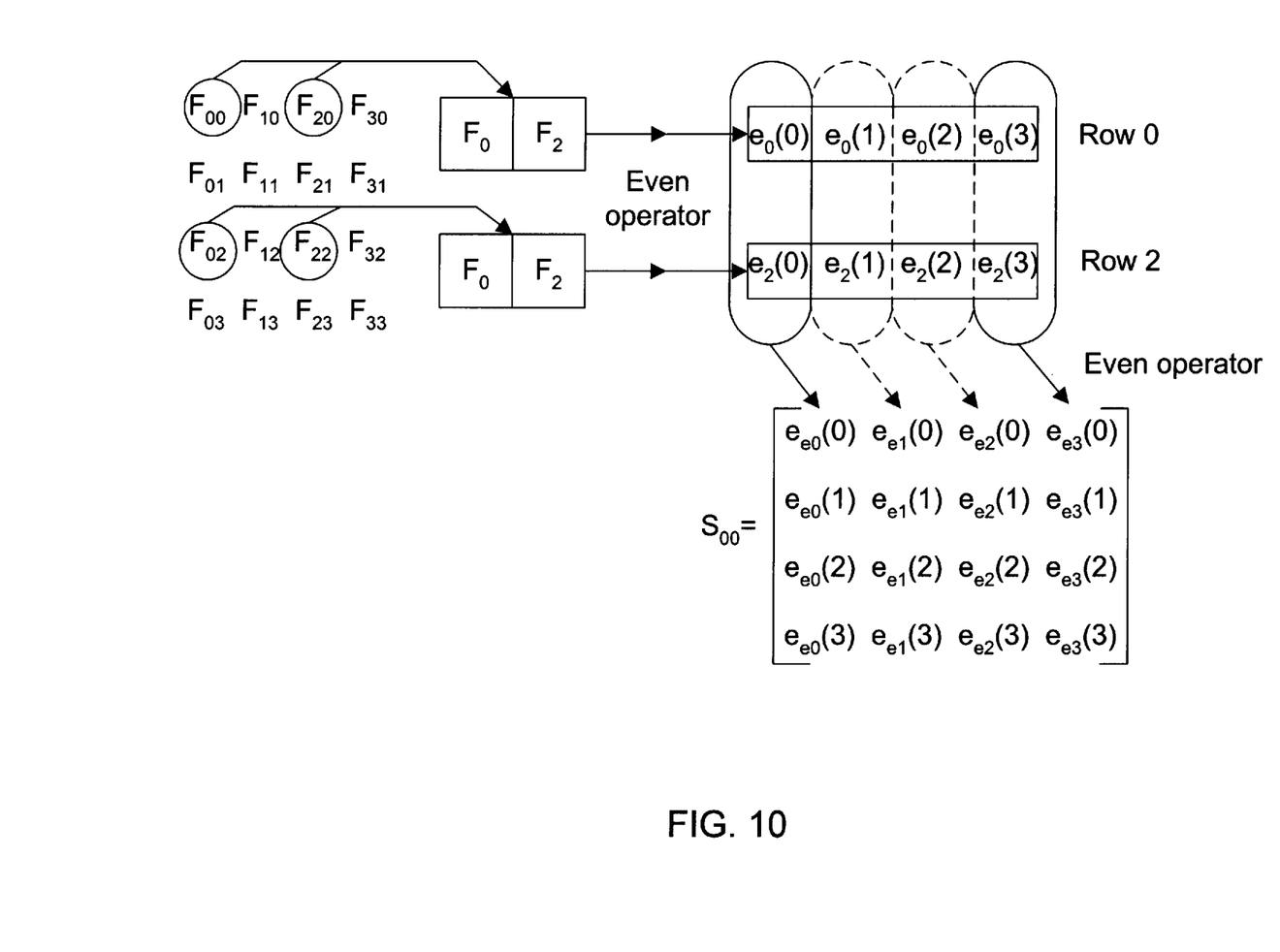
FIG. 10 is a diagram that illustrates calculation of the even-even IDCT component class and $s_{00}$.

Scaling Factors $s_0^1 = 0.35355339$
$s_1^1 = 0.490392640$
$s_2^1 = 0.461939766$
$s_3^1 = 0.415734806$ Calculation of the even-even IDCT component class $s_{00}$ is illustrated by FIG. 10. The even operator of FIG. 8 is first applied to each row of the even-even group of four pixels to generate two rows of four values each (i.e., $e_0(0) - e_0(3)$ and $e_2(0) - e_2(3)$). Each column of the result is then applied to the same even operator of FIG. 8 to obtain a 4×4 block of data as shown. This block of data is stored in $s_{00}(x,y)$, for x=0,1,2,3 and y=0,1,2,3. It is noted that the operators of FIGS. 8 and 9 may alternatively be applied column-wise first and then row-wise with no resulting difference in the calculated matrix $S_{00}$.

Figure 11:
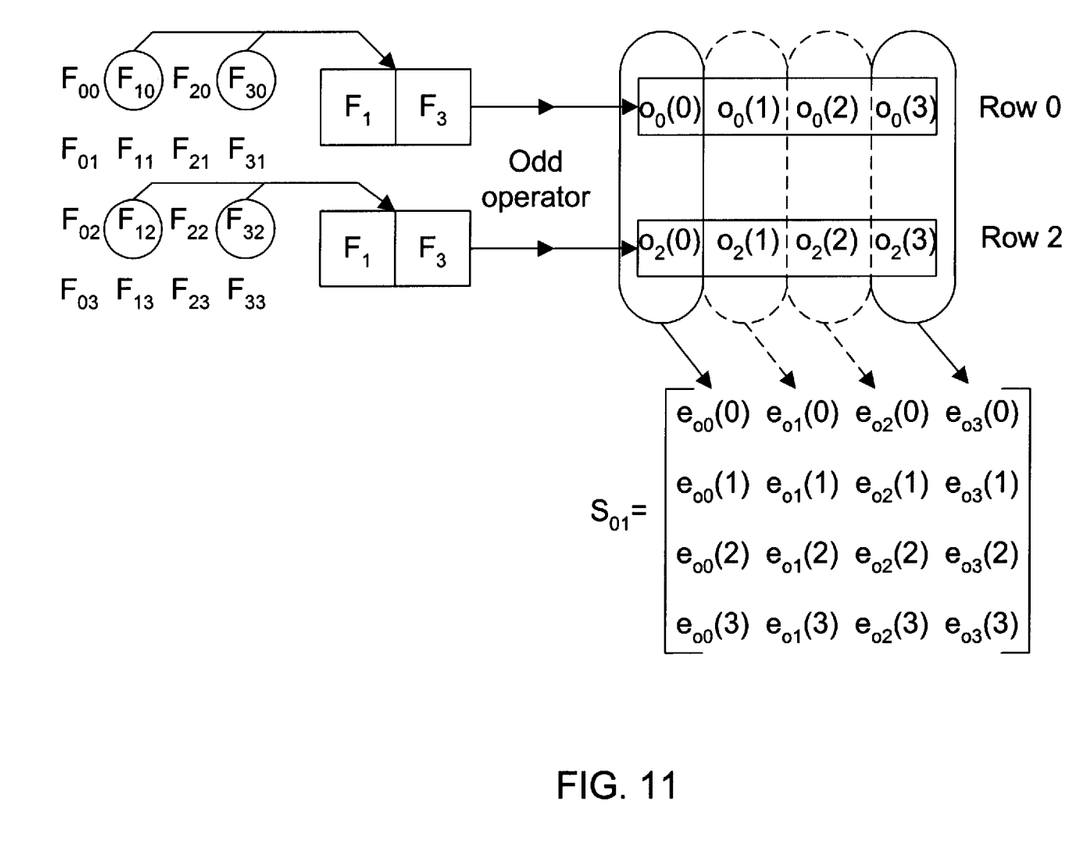
FIG. 11 is a diagram that illustrates calculation of the even-odd component class $s_{01}$.

Referring next to FIG. 11, for the even-odd group of DCT coefficients, the odd operator of FIG. 9 is applied row-wise and then the even operator of FIG. 8 is applied column-wise to the results of the odd operator operation. The end results are stored in $s_{01}(x,y)$ for x=0,1,2,3 and y=0,1,2,3. Again, the order of the row-wise and column-wise operations may be interchanged. For the odd-even and odd-odd groups, the odd operator is applied column-wise and the even or odd operator is applied row-wise, respectively. The results are stored in $s_{10}(x,y)$ and $s_{11}(x,y)$, respectively.

Upon calculation of the IDCT component classes $s_{00}$, $s_{01}$, $s_{10}$, and $s_{11}$ which form a first region result, computation may be performed upon the non-zero coefficients in the remainder region 502. For each non-zero coefficient F(u,v) in the remainder region 502 (u=0,1,2,3; v=4,5,6,7 and u=4, 5,6,7; v=0,1,...,7), where u refers to the row index and v refers to the column index, the accumulator (3) is updated by $$s_{parity(u), parity(v)}(x,y) = s_{parity(u), parity(v)}(x,y) + F(u,v) \times K_{uv}(x,y) \quad (3)$$

for x=0,1,2,3 and y=0,1,2,3, where $$K_{uv}(x,y) = \alpha(v)\cos\left[\frac{\pi(2x+1)u}{16}\right]\cos\left[\frac{\pi(2y+1)v}{16}\right]. \quad (4)$$

The parity (u) is the parity of u, i.e.

$$parity(u) = \begin{cases} 0, \text{ if } u \text{ is even} \\ 1, \text{ if } u \text{ is odd} \end{cases}$$

Similarly, the parity (v) is the parity of v, i.e., $$parity(v) = \begin{cases} 0, \text{ if } v \text{ is even} \\ 1, \text{ if } v \text{ is odd} \end{cases}$$

It is noted that upon complete calculation of equation (3) for all non-zero coefficients within the remainder 502, mathematically the resulting IDCT component classes $s_{00}$, $s_{01}$, $s_{10}$ and $s_{11}$ represent IDCT data for each of the component classes (i.e., even-even, even-odd, etc.) for the entire block of 8×8 DCT coefficient data.

Thus, mathematically, $$s_{00}(x,y) = \sum_{\substack{u \text{ are even} \\ v \text{ are even}}} F(u,v)K_{uv}(x,y)$$

where x,y=0, 1, 2, 3; u,v=0,1,2, . . . ,7;

F (u,v) are frequency coefficients;

$K_{uv}$ (x,y) are IDCT kernels of equation (4).
Also, $$s_{01} = \sum_{\substack{\text{even } u \\ \text{odd } v}} F(u,v)K_{uv}(x,y)$$

$$s_{10} = \sum_{\substack{\text{odd } u \\ \text{even } v}} F(u,v)K_{uv}(x,y)$$

$$s_{11} = \sum_{\substack{\text{odd } u \\ \text{odd } v}} F(u,v)K_{uv}(x,y)$$

Figure 12:
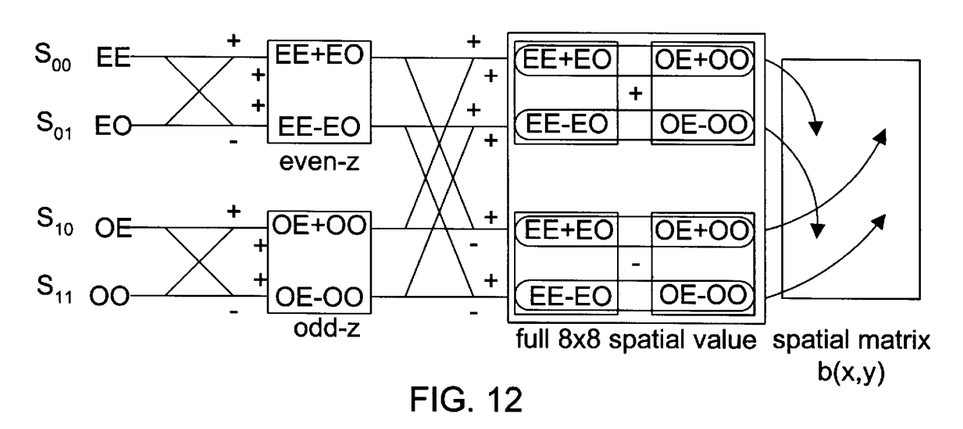
FIG. 12 is a diagram illustrating the mapping of IDCT component classes to a spatial matrix B (x, y) using butterfly operations.

The IDCT component classes are next mapped to the output matrix b(x,y). In one embodiment, this mapping operation may be performed by a two dimensional row-column butterfly operation as illustrated in FIG. 12. FIG. 12 illustrates how the even-even and even-odd classes can be combined element by element to produce the 8×4 even-x class which is even along the x direction, and similarly illustrates how the odd-even and odd-odd classes can be combined into an 8×4 odd-x class. Another butterfly operation yields the full spatial value matrix b(x,y), as illustrated.

The butterfly operations as illustrated in FIG. 12 to map the IDCT component classes to the output b(x,y) may be performed through calculation of several equations. Specifically, the first quadrant of the output block is calculated as:

$$b(x,y)=s_{00}(x,y)+s_{01}(x,y)+s_{10}(x,y)+s_{11}(x,y),$$

for x=0,1,2,3 and y=0,1,2,3.

Similarly, the second, the third and the fourth quadrants of the output block may be calculated as:

$$b(x,y+4)=s_{00}(x,3-y)-s_{01}(x,3-y)+s_{10}(x,3-y)-s_{11}(x,3-y)$$

$$b(x+4,y)=s_{00}(3-x,y)+s_{01}(3-x,y)-s_{10}(3-x,y)-s_{11}(3-x,y)$$

$$b(x+4,y+4)=s_{00}(3-x,3-y)-s_{01}(3-x,3-y)-s_{10}(3-x,3-y)+s_{11}(3-x,3-y)$$

for x=0,1,2,3 and y=0,1,2,3.

It is noted that in other embodiments, the mapping of the IDCT component classes to the output may be performed using other calculations or operations. For example, each 4×4 IDCT component class may be converted to an 8×8 component class in accordance with known symmetries. The converted 8×8 IDCT component classes may then be added together to form the output matrix b(x,y).

Figure 13:
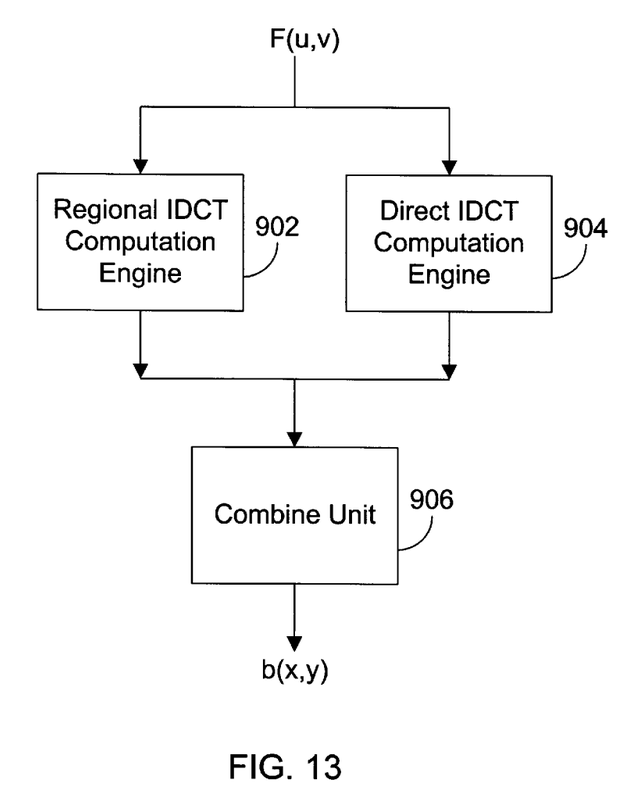
FIG. 13 is a block diagram illustrating a partitioning of functionality implemented within an IDCT computation unit.

FIG. 13 is a block diagram illustrating a partitioning of functionality implemented within one embodiment of an IDCT computation unit of, for example, video decoder 74 or video encoder 76. A regional IDCT computation engine 902 implements the regional IDCT calculations for first quadrant coefficients as described above, and a direct IDCT computation engine 904 implements the direct IDCT calculations for the remainder region non-zero coefficients as described above. A combine unit 906 performs the mapping and combining functionality as described above upon the calculated results of engines 902 and 904. The functionality of regional IDCT computation engine 902, of direct IDCT computation engine 904, and combine unit 906 may be implemented in either software or hardware, as desired.

Employment of the inverse discrete cosign transform methodology as described above may advantageously be performed more efficiently than prior art methodologies. The IDCT methodology may be employed within both image and video decompression and compression systems to attain high performance.

It is also understood that in other embodiments, the regions of a DCT coefficient matrix which define the first region and the remainder region may differ from those illustrated in FIG. 5. In addition, it is understood that operators other than those illustrated by FIGS. 8 and 9 may be applied to various coefficients upon effectuation of a regional IDCT algorithm.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method for performing an inverse discrete cosine transform (IDCT) upon a matrix of DCT coefficients to thereby construct a video image in a video system comprising:
    selecting a sub-matrix of DCT coefficients from said matrix of DCT coefficients;
    performing, in a regional IDCT computation unit, a regional inverse discrete cosine transform algorithm using each coefficient of said sub-matrix of DCT coefficients to derive a first region result;
    selecting only non-zero DCT coefficients from a remainder of said matrix of DCT coefficients;
    calculating, in a direct IDCT computation unit, an inverse discrete cosine transform component for each said non-zero DCT coefficient in said remainder; and
    adding said inverse discrete cosine transform component calculated for each said non-zero IDCT coefficient with said first region result.

2. The method for performing an inverse discrete cosine transform as recited in claim 1 further comprising retrieving each DCT coefficient of said matrix of said DCT coefficients from a memory.

3. The method for performing an inverse discrete cosine transform as recited in claim 1 wherein said remainder includes all DCT coefficients in said matrix other than DCT coefficients in said sub-matrix.

4. The method for performing an inverse discrete cosine transform as recited in claim 1 wherein said first region result includes an even-even IDCT component class, an even-odd IDCT component class, an odd-even IDCT component class, and an odd-odd IDCT component class.

5. The method for performing an inverse discrete cosine transform as recited in claim 4 wherein said even-even IDCT component class is calculated using even-row, even-column DCT coefficients within said sub-matrix, and is independent of odd-row and odd-column DCT coefficients of said sub-matrix.

6. The method for performing an inverse discrete cosine transform as recited in claim 5 wherein said even-odd IDCT component class is calculated using even-row odd-column DCT coefficients within said sub-matrix and is independent of odd-row and even-column DCT coefficients of said sub-matrix, and wherein said odd-even DCT component class is calculated using odd-row, even-column DCT coefficients within said sub-matrix and is independent of even-row and odd-column DCT coefficents of said sub-matrix, and wherein said odd-odd DCT component class is calculated using odd-row, odd-column DCT coefficients within said sub-matrix and is independent of even-row and even-column DCT coefficients of said sub-matrix.

7. The method for performing an inverse discrete cosine transform as recited in claim 6 wherein an even-operator is applied to each even-column DCT coefficient of said sub-matrix.

8. The method for performing an inverse discrete cosine transform as recited in claim 7 wherein an odd-operator is applied to each odd-column DCT coefficient of said sub-matrix.

9. The method for performing an inverse discrete cosine transform as recited in claim 8 wherein said output of said odd-operator applied to each odd-column DCT coefficient is applied to said odd-operator if said each odd-column DCT coefficient is an odd-row DCT coefficient.

10. The method for performing an inverse discrete cosine transform as recited in claim 9 wherein said output of said even-operator applied to each even-column DCT coefficient is applied to said even-operator if said even-column DCT coefficient is an even-row DCT coefficient.

11. The method for performing an inverse discrete cosine transform as recited in claim 10 wherein said output of said odd-operator applied to each odd-column DCT coefficient is applied to said even-operator if said each odd-column DCT coefficient is an even-row DCT coefficient.

12. The method for performing an inverse discrete cosine transform as recited in claim 11 wherein said output of said even-operator applied to each even-column DCT coefficient is applied to said odd-operator if said even-column DCT coefficient is an odd-row DCT coefficient.

13. The method for performing an inverse discrete cosine transform as recited in claim 6 wherein an even-operator is applied to each even-row DCT coefficient of said sub-matrix.

14. The method for performing an inverse discrete cosine transform as recited in claim 13 wherein an odd-operator is applied to each odd-row DCT coefficient of said sub-matrix.

15. The method for performing an inverse discrete cosine transform as recited in claim 5 wherein said inverse discrete cosine transform component calculated for each said non-zero DCT coefficient in said remainder is added to a corresponding one of either said even-even IDCT component class, said even-odd IDCT component class, said odd-even IDCT component class or said odd-odd IDCT component class depending on a row and column of said each non-zero DCT coefficient in said matrix.

16. The method for performing an inverse discrete cosine transform as recited in claim 15 further comprising, after adding said inverse discrete cosine transform component calculated for each non-zero DCT coefficient to said corresponding IDCT component class, mapping said IDCT component classes to an IDCT output matrix.

17. The method for performing an inverse discrete cosine transform as recited in claim 16 wherein said mapping of said IDCT component classes to said IDCT output matrix includes mapping a first-quadrant of said output matrix by adding each of said IDCT component classes.

18. The method for performing an inverse discrete cosine transform as recited in claim 17 wherein said mapping of said IDCT component classes to said full IDCT output matrix includes mapping a second, third, and fourth quadrant of said IDCT output matrix through calculation of the following equations:

$$b(x,y+4)=s_{00}(x,\ 3-y)-s_{01}(x,\ 3-y)+s_{10}(x,\ 3-y)-s_{11}(x,\ 3-y)$$

$$b(x+4,y)=s_{00}(3-x,y)+s_{01}(3-x,y)-s_{10}(3-x,y)-s_{11}(3-x,y)$$

$$b(x+4,\ y+4)=s_{00}(3-x,\ 3-y)-s_{01}(3-x,\ 3-y)-s_{10}(3-x,\ 3-y)+s_{11}(3-x,\ 3-y)$$

for x=0,1,2,3 and y=0,1,2,3, and where b(i, ii) represent spatial domain data of said full IDCT output matrix and $s_{i,ii}$ represent IDCT data of said IDCT component classes.

19. An inverse discrete cosine transform (IDCT) computation unit for a video system comprising:
   a regional IDCT computation engine configured to select a sub-matrix of DCT coefficients from a matrix of DCT coefficients and to perform a regional inverse discrete cosine transform algorithm using each coefficient of said sub-matrix of DCT coefficients to derive a first region result;
   a direct IDCT computation engine configured to select only non-zero DCT coefficients from a remainder of said matrix of DCT coefficients and to calculate an inverse discrete cosine transform component for each said non-zero DCT coefficient in said remainder; and
   a combine unit coupled to said regional IDCT computation engine and to said direct IDCT computation engine, wherein said combine unit is configured to add said inverse discrete cosine transform component calculated for each said non-zero IDCT coefficient with said first region result.

20. The IDCT computation unit as recited in claim 19 wherein said remainder includes all DCT coefficients in said matrix other than DCT coefficients in said sub-matrix.

21. The IDCT computation unit as recited in claim 19 wherein said first region result includes an even-even IDCT component class, an even-odd IDCT component class, an odd-even IDCT component class, and an odd-odd IDCT component class.

22. The IDCT computation unit as recited in claim 21 wherein said even-even IDCT component class is calculated by said regional IDCT computation engine using even-row, even-column DCT coefficients within said sub-matrix, and is independent of odd-row and odd-column DCT coefficients of said sub-matrix.

23. The IDCT computation unit as recited in claim 22 wherein said even-odd IDCT component class is calculated by said regional IDCT computation engine using even-row odd-column DCT coefficients within said sub-matrix and is independent of odd-row and even-column DCT coefficients of said sub-matrix, and wherein said odd-even DCT component class is calculated by said regional IDCT computation engine using odd-row, even-column DCT coefficients within said sub-matrix and is independent of even-row and odd-column DCT coefficents of said sub-matrix, and wherein said odd-odd DCT component class is calculated by said regional IDCT computation engine using odd-row, odd-column DCT coefficients within said sub-matrix and is independent of even-row and even-column DCT coefficients of said sub-matrix.

24. The IDCT computation unit as recited in claim 23 wherein said regional IDCT computation engine is configured to apply an even-operator to each even-column DCT coefficient of said sub-matrix.

25. The IDCT computation unit as recited in claim 24 wherein said regional IDCT computation engine is configured to apply an odd-operator to each odd-column DCT coefficient of said sub-matrix.

26. The IDCT computation unit as recited in claim 25 wherein said output of said odd-operator applied to each odd-column DCT coefficient is applied to said odd-operator if said each odd-column DCT coefficient is an odd-row DCT coefficient.

27. The IDCT computation unit as recited in claim 26 wherein said output of said even-operator applied to each even-column DCT coefficient is applied to said even-operator if said even-column DCT coefficient is an even-row DCT coefficient.

28. The IDCT computation unit as recited in claim 27 wherein said output of said odd-operator applied to each odd-column DCT coefficient is applied to said even-operator if said each odd-column DCT coefficient is an even-row DCT coefficient.

29. The IDCT computation unit as recited in claim 28 wherein said output of said even-operator applied to each even-column DCT coefficient is applied to said odd-operator if said even-column DCT coefficient is an odd-row DCT coefficient.

30. The IDCT computation unit as recited in claim 23 wherein said regional IDCT computation engine is configured to apply an even-operator to each even-row DCT coefficient of said sub-matrix.

31. The IDCT computation unit as recited in claim 30 wherein said regional IDCT computation engine is configured to apply an odd-operator to each odd-row DCT coefficient of said sub-matrix.

32. The IDCT computation unit as recited in claim 22 wherein said combine unit is configured to add said inverse discrete cosine transform component calculated for each said non-zero DCT coefficient in said remainder to a corresponding one of either said even-even IDCT component class, said even-odd IDCT component class, said odd-even IDCT component class or said odd-odd IDCT component class depending on a row and column of said each non-zero DCT coefficient in said matrix.

33. The IDCT computation unit as recited in claim 32 wherein map said IDCT component classes to an IDCT output matrix after adding said inverse discrete cosine transform component calculated for each non-zero DCT coefficient to said corresponding IDCT component class.

34. The IDCT computation unit as recited in claim 33 wherein said combine unit is further configured to map a first-quadrant of said output matrix by adding each of said IDCT component classes.

35. The IDCT computation unit as recited in claim 34 wherein said combine unit is further configured to map a second, third, and fourth quadrant of said IDCT output matrix through calculation of the following equations:

$$b(x,y+4)=s_{00}(x,\ 3-y)-s_{01}(x,\ 3-y)+s_{10}(x,\ 3-y)-s_{11}(x,\ 3-y)$$

$$b(x+4,y)=s_{00}(3-x,y)+s_{01}(3-x,y)-s_{10}(3-x,y)-s_{11}(3-x,y)$$

$$b(x+4,\ y+4)=s_{00}(3-x,\ 3-y)-s_{01}(3-x,\ 3-y)-s_{10}(3-x,\ 3-y)+s_{11}(3-x,\ 3-y)$$

for $x=0,1,2,3$ and $y=0,1,2,3$, and where $b(i,\ ii)$ represent spatial domain data of said full IDCT output matrix and $s_{i,ii}$ represent IDCT data of said IDCT component classes.

* * * * *